Sept. 13, 1960  J. J. KAPELLER  2,952,163
GEARS
Filed Jan. 16, 1959
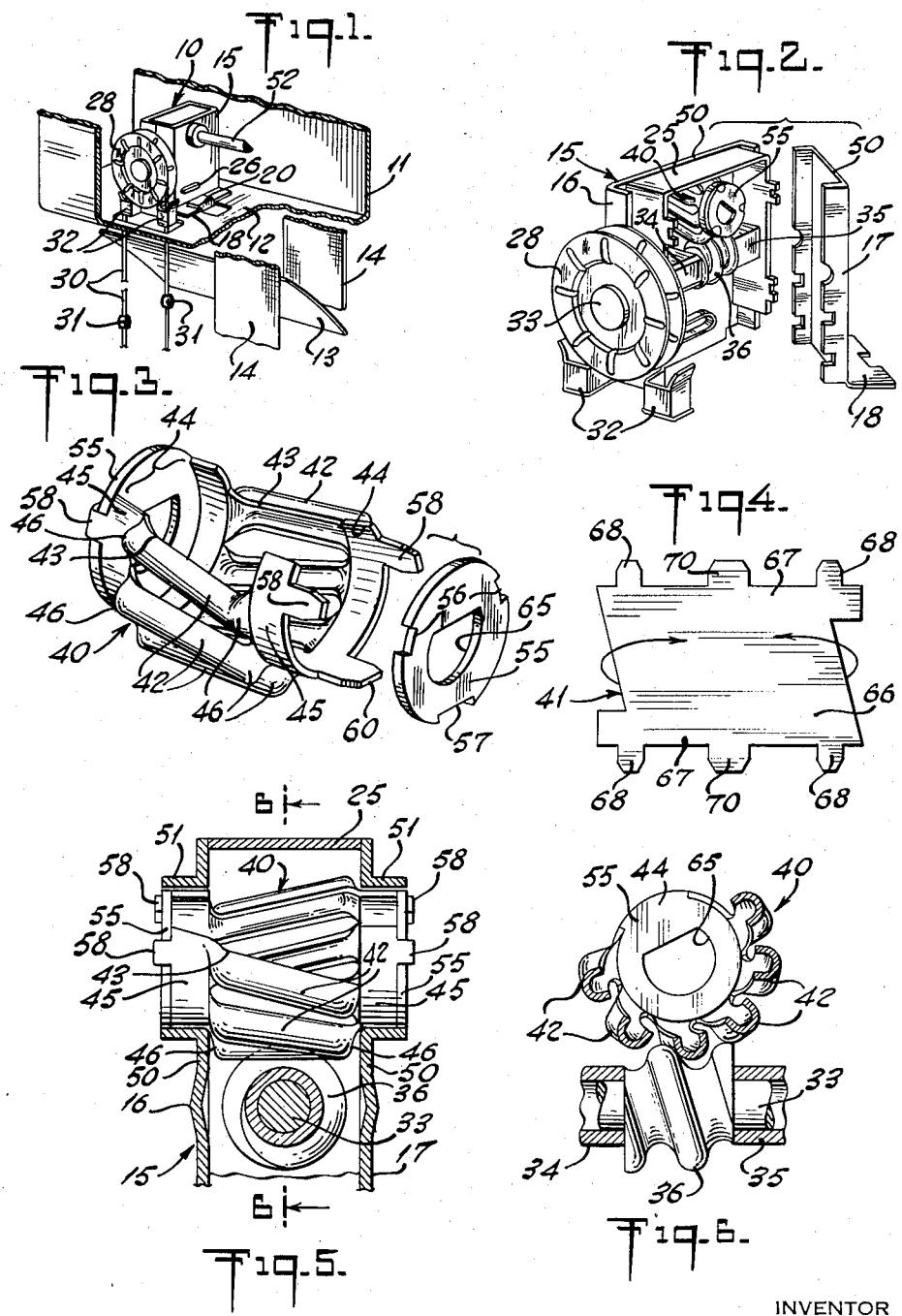
INVENTOR
JAMES J. KAPELLER
BY
Burgess, Ryan, & Hicks
ATTORNEYS

United States Patent Office 2,952,163
Patented Sept. 13, 1960

2,952,163
GEARS

James J. Kapeller, East Rutherford, N.J., assignor to Levolor Lorentzen, Inc., Hoboken, N.J., a corporation of New Jersey Filed Jan. 16, 1959, Ser. No. 787,288

9 Claims. (Cl. 74—449)

The present invention relates to a rigid gear adapted to mesh especially with a worm to form a gear transmission therewith, and although it has a wide range of utility, it is particularly useful in connection with the gear transmission of a tilter for a Venetian blind.

A conventional type of tilter for a Venetian blind to tilt the slats includes a worm and worm wheel or gear of contrasting metals to assure smooth operations. For example, the worm may be made of brass or nylon, while the gear referred to as a tilter gear, is usually made of steel, zinc, bronze or nylon.

Also, in the known type of tilter of the worm and gear type, the tilter gear is mutilated or of sector shape to provide by escapement means automatic adjustment for slippage of the operating cord of the Venetian blind tilter.

One object of the present invention is to provide a gear which is designed to be made by stamping from a single sheet of metal, such as steel, so that it is comparatively inexpensive to manufacture as compared, for example, with a gear made by casting, which is constructed to permit it easily to be made with well-formed teeth and with smooth surfaces and contours affording large contact areas, so that smooth operation is assured with little operating effort, which is constructed so that flaws or defects in the gear material are most unusual and become apparent by mere inspection thereof, in contrast with gears made by casting in which defects are common and very often cannot be detected by mere inspection, which is constructed for snug confinement between bearings against axial movement and for effective support in said bearings, and which is designed to permit the easy attachment thereto of end hub elements for keyed connection to a tilter shaft or rod.

Another object of the present invention is to provide a mutilated gear, i.e. a gear that has teeth only on a portion of its pitch line, constructed to attain the objects described above to permi its adaption in a tilter of the cord slippage self-copensating type described above.

A further object of the present invention is to provide a composite gear unit made up of a gear and a shaft keying attachment of improved types to attain the objects described above.

A still further object is to provide a Venetian blind tilter incorporating therein a tilter gear of the improved type described.

Various other objects, features and advantages of the invention are apparent from the following description and from the accompanying drawings, in which Fig. 1 is a fragmentary diagrammatic perspective of a tilter for a Venetian blind shown supported in a stationary head and incorporating therein a tilter gear embodying certain features of the present invention;

Fig. 2 is an exploded perspective view of the tilter showing the internal structure to reveal the construction of the tilter gear;

Fig. 3 is an exploded perspective view of the gear unit showing the tilter gear and associated shaft keying hub attachments embodying certain features of the present invention;

Fig. 4 is a plan view of the metal blank from which the tilted gear of the present invention is stamped;

Fig. 5 is a detail section of the tilter showing particularly the worm and gear transmission;

Fig. 6 is a section of the worm and gear transmission taken on lines 6—6 of Fig. 5.

Referring to the drawings, a tilter 10 is shown in which the gear of the present invention is particularly adapted to be used. This tilter 10 is shown in Fig. 1 supported in a stationary channel head 11 in the form of a box, mounted in end installation brackets (not shown) secured to the sides of a window opening. The tilter 10 is supported on the base 12 of the head 11 and operates a series of slats, only the first one being shown at 13, articulated through tapes 14, and operated from said tapes through a tilt-bar or tape drum (not shown).

The tilter 10 comprises a bracket 15 (Figs. 1, 2 and 5) on which the operating parts including the gear transmission described are supported. This bracket 15 comprises two channel or shell parts 16 and 17 secured together to form a housing for the gear transmission to be described and having respective base flanges 18 adapted to be secured to the base 12 of the fixed head 11, as for example, by tongues 20 cut out from said base and turned over said flanges.

An inverted U-shaped member 25 between the bracket parts 16 and 17 clinched or otherwise rigidly secured thereto, serves as a dust guard for the gear transmission. Holes 26 in the bracket parts 16 and 17 respectively, serve as clearance holes for the passage of the upper horizontal sections of the cord lock lift cords, when the tilter is located in some intermediate position of the supporting head 11 other than at the end.

The transmission by which the slats 13 are tilted comprises a pulley 28 supported on the bracket 15 for rotation. Around the pulley 28 is an operating cord 30 having depending branches with respective stops 31 desirably in the form of beads or sleeves affixed to said branches. In conjunction with the pulley 28 and cord 30, there are two cord guides 32 rigidly secured to the bracket 15 below the pulley through which the branches of the cord looped around the pulley passes. In limiting position of either stop 31, this stop engages the lower side of the corresponding cord guide 32.

The pulley 28 is supported for rotation by means of a shaft 33 to which said pulley is rigidly secured. This shaft 33 is journalled in self-lubricated bearings 34 and 35 of non-circular configurations, held against rotation in respective holes of corresponding configurations in the side legs of the U-shaped member 25 but having snug slide axial fits therein to afford ease of assembly. Between the two bearings 34 and 35 and secured to the shaft 33 is a worm 36, desirably of brass, forming part of the gear transmission for the tilter 10, and shown constituting a single thread with rounded contours.

The parts of the tilter 10 so far described, per se, form no part of the present invention, and have been described merely to show the environment where the gear of the present invention finds utility.

As a feature of the present invention, a rigid tilter gear 40 of improved construction is provided to mesh with the worm 36 to form the gear transmission therewith. This gear 40 is of mutilated construction to provide quasi-automatic compensation for slippage of the operating cord of the tilter, as will be described hereinafter, and is stamped from a single sheet 41 of metal shown in Fig. 4, substantially into the form of a squirrel-cage. It is desirable to make the intermeshing worm 36 and worm gear 40 of disparate metals in order to operate them with almost ball bearing smoothness, and since the worm 36 is of brass, it is advantageous to make the gear 40 of steel. The sheet 41 is shaped with a series of gear teeth 42 (Figs. 3, 5 and 6) and is arcuately curved with its ends 43 spaced to define therebetween a gap 44 free from gear teeth, so that the gear is in effect sector-shaped and has an inactive part along the gap. The teeth 42 are circumferentially spaced according to the pitch of the worm 36 and are inclined in relation to their pitch circle to correspond to the angle of the thread on the worm 36 in the manner of a conventional worm gear for proper operative mesh with the worm. More specifically, the angle of the gear teeth 42 in relation to their pitch circle is equal substantially to the helix angle of the worm 36 at or near its root diameter. These teeth 42 are shown in the form of channels having their concave sides facing radially inwardly and presenting smooth round contours on their outer convex sides. The ends of these teeth 42 integrally connect into journals 45 of smooth arcuate contours, the external diameters of these journals being equal and being less than the diameter of the outside gear teeth circle. This difference in the relative outside diameters of the journals 45 and the gear teeth 42 permits these teeth to project radially outwardly from the journals, thereby causing the teeth to mesh with the worm 36 without obstruction from the journals 45 and also serving to define shoulders 46 at the respective ends of the gear teeth. These shoulders 46 confined snugly between the side walls 50 of the bracket 15 prevent axial movements of the gear 40 relative to said bracket while permitting said gear to rotate through the drive action of the worm 36.

The gear 40 is rotated in the bracket 15 for rotation thereon, and for that purpose, the side walls 50 of the bracket have cylindrical flanges 51 stamped outwardly therefrom to serve as bearings for the journals 45. The limiting shoulders 46 on the gear 40 engage these side bracket walls 50 around these bearings.

The gear 40 is adapted to drive a tilter rod or shaft 52 by which the slats 13 of the Venetian blind are tilted, and for that purpose the ends of the gear 40 have connected thereto shaft keying hub attachments 55 shown in the form of circular discs or plates, each having a series of peripheral notches 56 and 57, three being shown to receive tongues or tabs 58 and 60 respectively extending from the journal 45. These tabs 58 and 60 have tapering ends to facilitate their entry into the respective notches 56 and 57 of the shaft keying plates 55 during assembly and are bent over these plates to permanently retain these plates in position. The diameter of these hub attachment plates 55 is the same as the external diameter of the journals 45, so that the outer circumferential surfaces of the journals and the plates are flush.

Each of the hub attachment plates 55 has an opening 65 to permit the tilter rod or shaft 52 to pass therethrough and through the hollow gear 40 and this opening has a keying conformation shown specifically in the shape of a chordally truncated circle to receive snugly the similarly shaped tilter shaft and to lock said shaft to said gear for rotation therewith. The plates 55 serve not only as attachment devices for the tilter shaft 52, but in cooperation with the tabs 58 and 60 serve to reinforce the gear 40 against inward radial stresses.

When the tilter 10 is assembled, the journals 45 extend into the bearings 51 with bearing fits and terminate substantially flush with the outer ends of said bearings, as shown in Fig. 5.

As previously described, the gear 40 is stamped from the flat blank 41 shown in Fig. 4. To that end, the blank 41 comprises a main body section 66 from which the teeth 42 are cut, formed and projected from the plane of the blank, side sections 67 from which the journals 45 are formed and fingers 68 and 70 serving to form the tabs 58 and 60 of the gear 42. After the gear teeth are formed in the blank 41, the blank is arcuately curved to form the gear 40.

In the operation of the tilter 10, when the slats 13 are in neutral horizontal position, the cord 30 if in correct position in relation to the gear 40 and free from slippage displacement, will be in central position with the two limiting stops 31 in horizontal alignment and the gear 40 will be in center mesh position in relation to the worm 36. The pulling of either depending branch of the operating cord 30 will cause the rotation of the pulley 28, which in turn will rotate the worm 36 and drive the gear 40 in a corresponding direction from this centralized mesh position causing the tilter shaft 52 secured to said gear to rotate in a corresponding direction and the slats 13 to tilt in a corresponding direction.

The stops 31 are desirably sufficiently far apart along the cord 28, so that when the properly adjusted cord 30 is operated through its full slat tilting range, neither of the stops will engage the corresponding cord guide. Also, the angle of the teeth sector around the tilter gear is desirably sufficiently large to maintain the tilter gear in mesh with the worm in either extreme tilted position of the slats 13, when the cord 30 is properly adjusted, although under certain conditions, it would be permissible to allow the tilter gear to reach escapement position in either or both extreme positions of the slats.

The distance between the cord stops 31 depends on the angle of the teeth sector around the tilter gear, and it is desirable to locate the two stops to allow some cord slippage to accumulate before adjustments in the cord are automatically made by escapement. For example, the cord stops 31 may be sufficiently far apart to permit approximately one complete rotation of the pulley 28 in addition to the number of pulley rotations required for complete movement of the gear 40 in mesh with the worm 36. With the cord stops 31 so located, when the cord 30 accumulates slippage on the pulley 28 in a direction corresponding to at least one complete revolution of the pulley, downward pull of the appropriate cord branch in the opposite direction will cause the gear 40 to be driven in appropriate direction until the gear has moved in escapement position just out of mesh with the worm 36 and can no longer be driven by the worm. Further downward pull on this cord branch will cause the pulley 28 and worm 36 to rotate idly until the stop 31 on the other cord branch engages the corresponding cord guide 32. Thus, the worm 36 gains one revolution relative to the gear 40 and thereby compensates for the accumulated slippage of the cord 30, bringing the cord back to its proper position in relation to the gear.

Canting forces imposed upon the gear 40 by the weight of the tilted slats 13 biases the gear towards center position. Therefore, as the pulled cord branch which has reached the limit of its position described is released from pulling action, the gear 40 which just prior to its disengagement from the worm 36 was moving in one direction, will move in the opposite direction back into mesh with the worm 36, so that a pull on the opposite cord branch will immediately start moving the gear in this opposite direction by the drive action of the worm. Thereafter, movement of the cord 30 tilts the slats 13 in the conventional manner until cord slippage has again accumulated in an amount which results in another idle compensating rotation of the worm 36 upon the pulling of the appropriate cord branch in the manner described. Constant use keeps the cord 30 properly positioned relative to the gear 40 automatically, without conscious adjustment.

The gear 40 constructed as described is inexpensive to manufacture, and although it is made by stamping, it affords large areas assuring smooth almost effortless operations. Since the gear 40 is stamped from sheet metal, any defects therein will be apparent by mere inspection thereof. That is not the case with solid cast gears whose internal flaws cannot be detected by mere visual observations before installation. Moreover, since the gear 40 so stamped from sheet metal is hollow, the tilter shaft 52 can be made to extend therethrough and to connect thereto without the necessity of boring the gear and of providing any special or complicated keying devices in connection therewith. The shaft keying attachment plates 55 afford an easy, efficient and expeditious way of connecting the gear 40 to the tilter shaft 52.

Also, the gear 40 being stamped of sheet metal, it permits the absence of teeth along a portion of its pitch circle to provide for the self-adjustments of the cord 30 through escapement as described, by merely spacing the ends of the blank in the arcuate shaping thereof.

The hollowness of the gear 40 and the gap between its teeth 42 permits lubrication to have direct access from the interior of the gear to the contacting mesh surfaces of the gear transmission. For heavy duty work, a lubricated wick can be placed inside the gear 40 to serve as an oil reservoir.

While the invention has been described with particular reference to a specific embodiment, it is to be understood that it is not limited thereto but is to be construed broadly and restricted solely by the scope of the appended claims.

What is claimed is:

1. A rigid gear comprising a sheet of metal which has gear teeth cut and shaped therefrom and which is bent into permanent arcuate shape, each of said teeth being of channel form with its concave side facing radially inwardly.

2. A rigid gear comprising a sheet of metal which has gear teeth cut and shaped therefrom and which is bent into permanent arcuate shape, the ends of the sheet being spaced to form a gap therebetween along which the teeth are missing to define a mutilated gear.

3. A rigid gear comprising a sheet of metal which has gear teeth shaped therefrom and which is bent into arcuate shape, said teeth at one end being spaced from a corresponding side of the sheet and projecting radially outwardly from the side section of the sheet to cause said side section of the sheet to form a journal for said gear, and to form a shoulder at said end of the teeth.

4. A rigid worm gear comprising a sheet of metal which has gear teeth shaped therefrom and which is bent into permanent arcuate shape, said teeth being inclined in relation to their pitch circle to mesh with a worm to form a gear transmission therewith and being of channel formation.

5. A rigid worm gear comprising a sheet of metal which has gear teeth shaped therefrom and which is bent into permanent arcuate shape, each of said teeth being channel form with its concave side facing radially inwardly, the ends of said teeth being spaced from the corresponding sides of the sheet to define beyond the ends of said teeth journals for the gear and to define shoulders at the ends of said teeth, said teeth projecting radially outwardly beyond said side sheet section and extending in directions to allow said gear to mesh with a worm to form a gear transmission therewith.

6. A composite rigid gear unit comprising a sheet of metal which has gear teeth shaped therefrom and which is bent into permanent arcuate shape to define a gear, and a plate secured to one end of the gear and having a shaft receiving and keying conformation.

7. A composite rigid gear unit as described in claim 6, wherein one end of said gear has a series of tabs projecting from the periphery thereof, and said plate has a plurality of corresponding peripheral notches into which said tabs extend, said tabs being bent over said plate to retain said plate onto said gear.

8. A composite rigid gear unit comprising a sheet of metal which has gear teeth shaped therefrom and which is bent into permanent arcuate shape, each of said teeth being of channel form with its concave side facing radially inwardly, the ends of said teeth being spaced from the corresponding sides of the sheet to define beyond the ends of said teeth journals for the gear, said teeth projecting radially outwardly beyond said side sheet section to define shoulders at ends of said teeth, and extending in directions to mesh with a worm to form a gear transmission therewith, said teeth extending only around a portion of the pitch circle of the gear to define a mutilated gear, and plates secured to opposite ends of the gear and each having a hole to receive a shaft, said hole having a shaft receiving and keying configuration, each end of said gear having a series of tabs projecting from the periphery thereof, and each of said plate having a plurality of corresponding peripheral notches into which the tabs of each series of tabs extend, said tabs being bent over said plates to retain said plates onto said gear.

9. In a tilter for a Venetian blind, a bracket forming a housing with opposite walls provided with coaxial bearings, a gear transmission in said housing adapted to be operated from a tilt cord and to operate a tilt shaft and supported on said housing, said transmission comprising a drive worm operated from the tilt cord and a worm gear meshing with said worm and connected to the tilt shaft, said gear comprising a sheet of metal which has gear teeth shaped therefrom and which is bent into permanent arcuate shape, the ends of said teeth being spaced from the corresponding sides of the sheet to define beyond the ends of said teeth arcuate sheet sections, said teeth projecting radially beyond said side sections to define shoulders at the ends of said teeth, said sheet sections constituting journals for said gear supported in said bearings, and said gear being confined snugly between said bracket walls against axial movements by said shoulders.

References Cited in the file of this patent

UNITED STATES PATENTS

| 951,503 | Johnston | Mar. 8, 1910 |
| 1,394,127 | Stone | Oct. 18, 1921 |
| 1,448,803 | Huntington | Mar. 20, 1923 |
| 1,754,205 | Jones | Apr. 8, 1930 |
| 2,098,439 | Stuber | Nov. 9, 1937 |
| 2,223,997 | Lorentzen | Dec. 3, 1940 |
| 2,226,623 | Lorentzen | Dec. 31, 1940 |
| 2,230,807 | Lorentzen | Feb. 4, 1941 |
| 2,704,882 | Olson | Mar. 29, 1955 |

FOREIGN PATENTS

| 3,411 | Great Britain | Feb. 11, 1904 |